(12) United States Patent
Fahland et al.

(10) Patent No.: US 9,902,439 B2
(45) Date of Patent: Feb. 27, 2018

(54) CONTROL OF AIRFLOW RELATIVE TO A VEHICLE VIA ACTIVE UNDERBODY PANEL(S)

(71) Applicant: GM GLOBAL TECHNOLOGY OPERATIONS LLC, Detroit, MI (US)

(72) Inventors: Jason D. Fahland, Fenton, MI (US);
Joshua R. Auden, Brighton, MI (US);
David Dominguez, Tucson, AZ (US);
Samantha J. Bray, South Bend, NE (US)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

(21) Appl. No.: 14/987,278

(22) Filed: Jan. 4, 2016

(65) Prior Publication Data
US 2017/0190364 A1  Jul. 6, 2017

(51) Int. Cl.
*B62D 35/02* (2006.01)
*B62D 37/02* (2006.01)

(52) U.S. Cl.
CPC ............. *B62D 35/02* (2013.01); *B62D 37/02* (2013.01)

(58) Field of Classification Search
CPC .... B62D 35/007; B62D 37/02; B62D 35/001; B62D 35/005; B62D 35/02; B62D 35/00; B62D 35/008
USPC ... 296/180.5, 180.1, 193.09, 76, 217, 180.4; 180/68.1; 701/49, 36; 362/496, 541
See application file for complete search history.

(56) References Cited

U.S. PATENT DOCUMENTS

| | | | | |
|---|---|---|---|---|
| 3,791,468 A * | 2/1974 | Bryan, Jr. | ............... | B62D 37/02 105/1.3 |
| 4,810,022 A * | 3/1989 | Takagi | .................. | B62D 35/005 180/197 |
| 6,447,049 B1 * | 9/2002 | Tohda | ..................... | B60R 19/12 293/117 |
| 6,575,522 B2 * | 6/2003 | Borghi | ................. | B62D 35/005 296/180.1 |
| 6,742,831 B2 * | 6/2004 | Rees | .................... | B62D 35/007 180/903 |
| 7,828,368 B2 * | 11/2010 | Ortega | ................. | B62D 35/001 296/181.5 |
| 9,333,994 B1 * | 5/2016 | Fahland | ............... | B62D 35/007 |
| 2017/0096180 A1 * | 4/2017 | Dominguez | ........... | B62D 37/02 |

* cited by examiner

*Primary Examiner* — D Glenn Dayoan
*Assistant Examiner* — Sunsurraye Westbrook
(74) *Attorney, Agent, or Firm* — Quinn IP Law

(57) ABSTRACT

The vehicle has a vehicle body including a first body end facing incident ambient airflow, a second body end opposite of the first body end, an underbody section spanning a distance between the first and second body ends, and vehicle subsystem arranged proximate the underbody section. A panel is moveably mounted to the underbody section and configured to regulate access of an underbody portion of the incident airflow to the subsystem. A mechanism is configured to shift the panel to selectively expose at least a part of the subsystem to the underbody portion of the incident airflow and shield the subsystem to thereby enhance aerodynamics of the vehicle body. A sensor detects a vehicle operating parameter and communicates the detected operating parameter to a controller. The controller is configured to regulate the mechanism and thereby shift the panel in response to the detected vehicle operating parameter.

20 Claims, 4 Drawing Sheets

US 9,902,439 B2

CONTROL OF AIRFLOW RELATIVE TO A VEHICLE VIA ACTIVE UNDERBODY PANEL(S)

TECHNICAL FIELD

The disclosure relates to active panel(s) for a vehicle underbody employed to control ambient airflow relative to the vehicle.

BACKGROUND

Aerodynamics is a study of objects moving through air and is a significant factor in vehicle design, including automobiles. Automotive aerodynamics is the study of the aerodynamics of road vehicles. The main goals of the study are reducing vehicle drag and wind noise, minimizing noise emission, as well as preventing undesired lift forces and other causes of aerodynamic instability during cornering and at high speeds via management of airflow. The study is typically used to shape vehicle bodywork and add-on aerodynamic devices for achieving a desired compromise among the above characteristics for specific vehicle use. Additionally, the study of aerodynamics may be used to generate appropriate airflow into the vehicle passenger compartment and provide cooling for various vehicle components and systems.

SUMMARY

An airflow regulation system for a vehicle is disclosed. The vehicle has a vehicle body including a first vehicle body end configured to face incident ambient airflow, a second vehicle body end opposite of the first vehicle body end, and a vehicle underbody section configured to span a distance between the first and second vehicle body ends. The vehicle also has a vehicle subsystem arranged proximate the vehicle underbody section. The airflow regulation system includes a panel moveably mounted to the underbody section and configured to regulate access of an underbody portion of the incident airflow to the vehicle subsystem. The airflow regulation system also includes a mechanism configured to shift the panel to selectively expose at least a part of the vehicle subsystem to the underbody portion of the incident airflow and shield the vehicle subsystem to thereby enhance aerodynamics of the vehicle body. The airflow regulation system additionally includes at least one sensor configured to detect a vehicle operating parameter and a controller in electronic communication with the at least one sensor. The controller is configured to regulate the mechanism to thereby selectively shift the panel in response to the detected vehicle operating parameter.

The access of the underbody portion of the incident airflow to the vehicle subsystem can be provided via a variable size access opening between the ambient and the vehicle underbody section. The variable size access opening may be defined by boundaries of the panel and the underbody portion. In such a case, the panel can be selectively shifted via the mechanism to vary the size of the opening.

The mechanism may include at least one of a linear actuator, a rotary actuator, and an electric motor.

The panel can be mounted to the vehicle body via a track and at least one roller and/or a bearing.

The panel may be configured to tilt, in other words operate as a louver or a shutter, relative to the vehicle body.

The at least one sensor may include a first sensor configured to detect a road speed of the vehicle and communicate the detected road speed to the controller. The controller may be configured to selectively shift, via the mechanism, the panel relative to the vehicle body in response to the detected road speed of the vehicle.

The at least one sensor may also include a second sensor configured to detect a temperature of the vehicle subsystem and communicate the detected temperature to the controller. The controller may be configured to selectively shift, via the mechanism, the panel relative to the vehicle body in response to the detected temperature.

The airflow regulation system may also include a road wheel and the first sensor can be configured to detect a rotating speed of the road wheel.

The vehicle subsystem can be one of an internal combustion engine, an exhaust system, a transmission assembly, a transfer case, and a differential.

A vehicle including such a system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
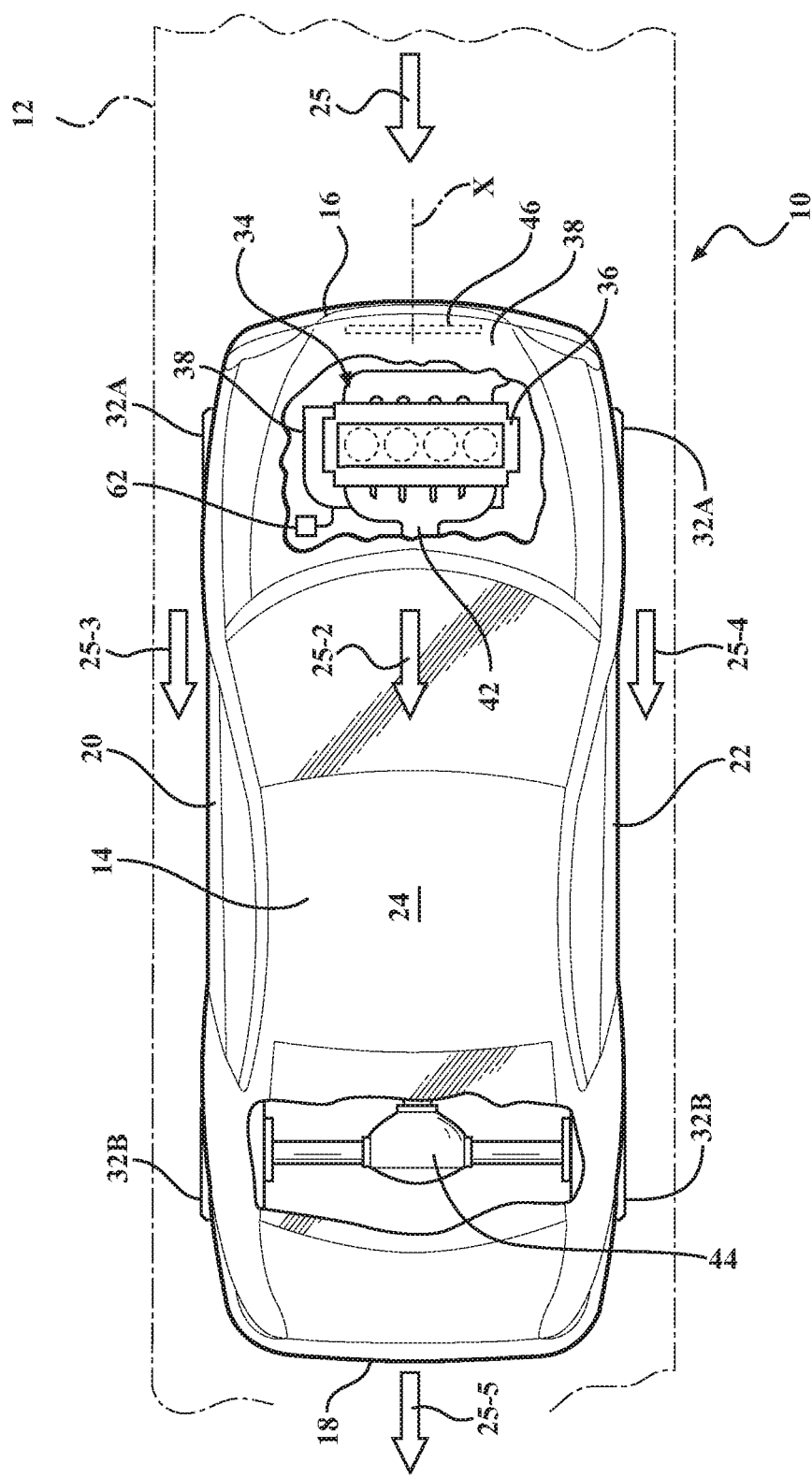
FIG. 1 is a schematic top view of a vehicle according to the disclosure, having various vehicle subsystems.

Referring to the drawings, wherein like reference numbers refer to like components, FIG. 1 shows a schematic view of a motor vehicle 10 positioned relative to a road surface 12. The vehicle 10 includes a vehicle body 14 having a longitudinal axis X. The vehicle body 14 defines six body sides. The six body sides include a first body end or front end 16, an opposing second body end or rear end 18, a left side 20, and a right side 22, a top body section 24, which frequently includes a vehicle roof, and an underbody section 26 (shown in FIG. 3). As understood by those skilled in the art, the front end 16 is configured to face oncoming or incident, i.e., approaching and contacting, ambient airflow 25, for example when the vehicle is in motion relative to the road surface 12.

Figure 3:
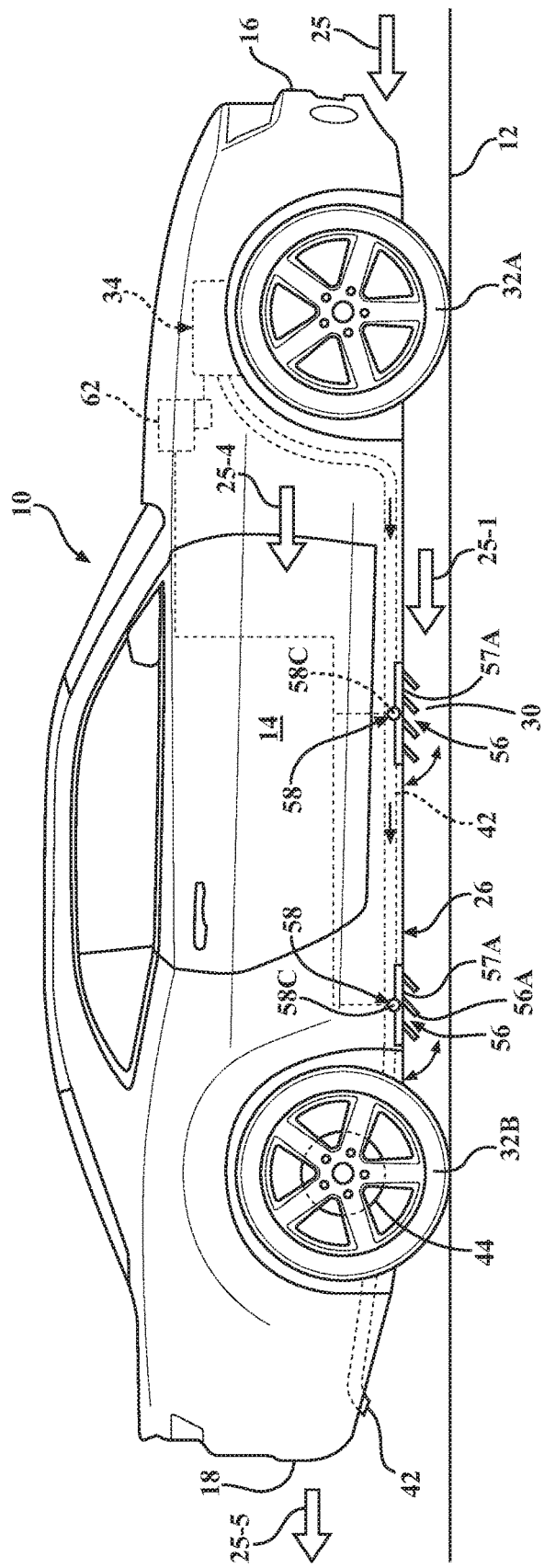
FIG. 3 is a schematic side view of the vehicle depicting the vehicle subsystems and another embodiment of the airflow regulation system configured to selectively generate airflow to the vehicle subsystems shown in FIGS. 1 and 2 according to the disclosure.

As shown in FIG. 3, the underbody section 26 is configured to span a distance 28 between the front and rear ends 16, 18 of the body 14. The underbody section 26 may have a surface configured, such as shaped or formed, to accommodate components of various vehicle subsystems that will be discussed in greater detail below. The underbody section 26 also defines a space 30 between the vehicle body 14 and the road surface 12 (as shown in FIG. 3). Accordingly, the space 30 permits the first or underbody airflow portion 25-1 to pass under the vehicle body 14, between the vehicle body 14 and the road surface 12, while a second airflow portion 25-2 passes over the top body section 24. Furthermore, a third airflow portion 25-3 passes around the left side 20 and a fourth airflow portion 25-4 passes around the right side 22. The airflow portions 25-1, 25-2, 25-3, and 25-4 all rejoin behind the rear end 18 in a wake area or recirculating airflow region 25-5 immediately behind the rear end 18 of the moving vehicle. As understood by those skilled in the art, the recirculating airflow region 25-5 is generally caused at elevated vehicle speeds by the flow of surrounding air around the body sides 18, 20, 22, 24, and 26.

Figure 2:
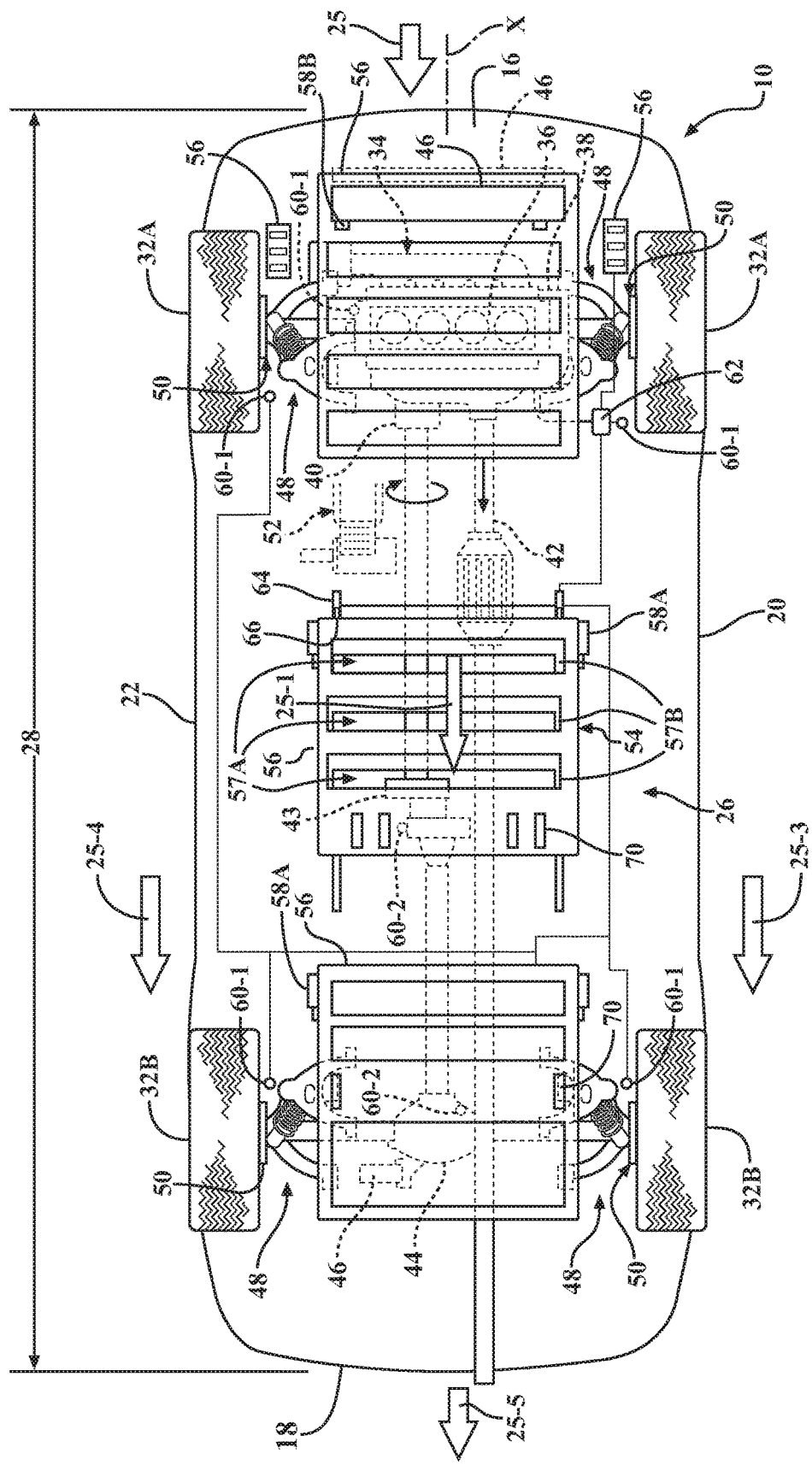
FIG. 2 is a schematic bottom view of the vehicle including a plan view of various vehicle subsystems and an airflow regulation system configured to selectively generate airflow to the vehicle subsystems shown in FIG. 1 according to the disclosure.

With reference to FIGS. 1-3, the vehicle 10 includes a plurality of road wheels, specifically front wheels 32A and rear wheels 32B, and a powertrain 34 operating as a vehicle subsystem that may include an internal combustion engine 36 for generating engine torque. As understood by those skilled in the art, the engine 36 generates a flow of exhaust gas discharged to the ambient via an exhaust system 42 extending along the underbody section 26 and having various resonators, mufflers, and exhaust emission reduction devices. The powertrain 34 can also include transmission 38 operatively connecting the engine 36 to at least some of the road wheels 32A, 32B for transmitting engine torque thereto. The powertrain 34 can additionally include a fuel cell (not shown) and/or one or more electric motor-generators 40, as shown in FIG. 2, operatively connected to at least some of the road wheels 32A and 32B and arranged inside the transmission 38 or external thereto. Additionally, the powertrain 34 can include a four-wheel-drive transfer case 43 (shown in FIG. 2) and a differential 44 (shown in FIGS. 1-4).

Another representative vehicle subsystem may include various heat exchangers 46 configured to remove thermal energy from at least some temperature-sensitive areas and subsystems of the vehicle 10, such as from the powertrain 34. As shown, the vehicle 10 may also include a vehicle suspension generally indicated at 48 and having various components arranged proximate the underbody section 26. The vehicle 10 may also include other subsystems, such as a braking system generally indicated at 50, and a heating, ventilation, and air conditioning (HVAC) system generally indicated at 52 that typically uses heat exchangers such as the exchanger 46. The above discussed subsystems are deemed as representative of the general category of vehicle subsystems that may have components arranged proximate the underbody section 26 and are not to be seen as limiting the scope of the present disclosure. In general, the vehicle subsystems representatively discussed above may derive a benefit from being exposed to the first airflow portion 25-1, whether for cooling of the subsystem itself or for conducting airflow to other areas or subsystems.

Figure 4:
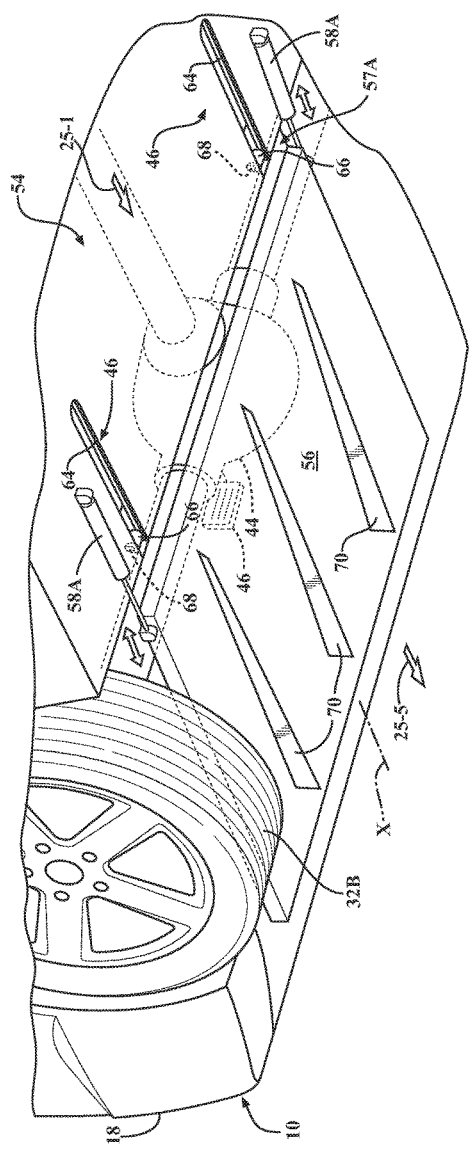
FIG. 4 is a schematic close-up partial perspective bottom view of the rear end of the vehicle depicting an embodiment of the airflow regulation system according to the disclosure.

As shown in FIGS. 2-4, the vehicle 10 also includes an airflow regulation system 54. The airflow regulation system 54 includes at least one panel 56 movably mounted to the underbody section 26 and configured to regulate access of an underbody portion 25-1 of the incident airflow 25 to any vehicle subsystem system such as those representatively discussed above. The access of the underbody portion 25-1 of the incident airflow to a specific vehicle subsystem is provided via a variable size access opening 57A between the ambient and the vehicle underbody section 26. The variable size access opening 57A can be defined by the structure of the vehicle body 14 and a selected position of the particular panel 56 relative to the vehicle body, i.e., by boundaries of the respective panel and the underbody portion 25-1, generally indicated at 57B in FIG. 2. As such, each of the individual moveable panels 56 is configured to vary the size of the respective access opening 57A and thereby regulate the volume of the underbody airflow portion 25-1 directed toward the respective vehicle subsystem from the space 30.

The airflow regulation system 54 also includes a mechanism 58 configured to shift the panel 56. Such shifting of the panel 56 is intended to selectively expose at least a part of the specific vehicle subsystem to the underbody portion 25-1 of the incident airflow when the access opening 57A is uncovered to some predetermined degree, and shield the subject vehicle subsystem when the opening is covered, thereby enhancing aerodynamics of the vehicle body 14. The airflow regulation system 54 also includes at least one sensor, to be described in detail below, configured to detect some specific vehicle operating parameter. The airflow regulation system 54 additionally includes a controller 62 in electronic communication with each respective sensor and configured to regulate the mechanism 58 to thereby selectively shift the panel 56 in response to the detected vehicle operating parameter.

The controller 62 may include a central processing unit (CPU) configured to regulate operation of the powertrain 34, as well as other vehicle systems, or a dedicated controller. In order to appropriately control operation of the mechanism 58, the controller 62 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 62 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 62 may also include a floppy disk, a flexible disk, hard disk, magnetic tape, any other magnetic medium, a CD-ROM, DVD, any other optical medium, etc. The controller 62 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 62 or accessible thereby may be stored in the memory and automatically executed to provide the required functionality.

The moveable panel 56 can be configured to shift along the longitudinal axis X, and uncover the access opening 57A by being shifted toward the rear end 18 and close the opening by being shifted toward the front end 16 of the vehicle body 14. A reverse articulation, i.e., where the panel is shifted toward the front end 16, can also be employed. The mechanism 58 can include at least one linear actuator 58A (shown in FIGS. 2 and 4), rotary actuator 58B, and/or electric motor 58C (shown in FIG. 3). As shown on FIG. 4, the panel 56 can be slidably mounted to the vehicle body 14 via a track 64, at least one roller 66, and/or a bearing 68. Alternatively, as shown in FIG. 3, the panel 56 may be configured to tilt or pivot relative to the vehicle body 14, and thus be operated as single or multiple louver(s) or shutter(s) 56A. The panel configured as one or more louvers can be configured to open such that the individual louver(s) scoop the air into the access opening 57A (shown in FIG. 3) or exhaust the air thereform, which is not specifically shown, but can be readily envisioned.

The panel 56 may be one of a plurality of panels operatively linked together and configured to selectively cover and uncover the access opening 57A as discussed above, whether for the sliding or pivoting configurations disclosed above. Such may be especially beneficial if the size of the access opening 57A makes packaging one sliding or pivoting panel for appropriately regulating the single access opening impractical. In yet another embodiment, the moveable panel(s) 56 may be configured to shift in a direction substantially perpendicular to the axis X but still parallel to the road surface 12. The airflow regulation system 54 may include as many or as few independently moveable panels 56 for regulating the airflow to the individual subsystems, such as the subsystems 34, 46, 48, 50, and 52, and/or their individual heat sensitive components.

The previously noted sensors may include one or more first sensors 60-1 configured to detect a road speed of the vehicle 10 as the subject vehicle operating parameter and communicate the detected road speed to the controller 62. As such, the first sensor(s) 60-1 may be configured to detect a rotating speed of the road wheel(s) 32A, 32B. Alternatively, the first sensor(s) 60-1 may be configured as a pitot tube to detect a velocity of incident ambient airflow 25 relative to the vehicle 10. Accordingly, the controller 62 is also configured to selectively shift, via the mechanism 58, the panel(s) 56 relative to the vehicle body 14 and vary the size of the access opening 57A in response to the road speed of the vehicle detected by the first sensor(s) 60-1, such as upon detection of a predetermined threshold vehicle speed programmed into the controller.

The previously disclosed sensors may also include one or more second sensors 60-2 configured to detect a temperature as the subject vehicle operating parameter of a particular vehicle subsystem, such as the subsystems 34, 46, 48, 50, and 52 described above in representative fashion and communicate the detected temperature to the controller 62. Accordingly, the controller 62 is also configured to selectively shift, via the mechanism 58, the panel(s) 56 relative to the vehicle body 14 and vary the size of the access opening 57A in response to the temperature detected by the second sensor(s) 60-2, such as upon detection of a predetermined threshold temperature programmed into the controller.

The moveable panel 56 may additionally include one or more fins 70 arranged longitudinally relative to the vehicle body 14, i.e., along the X-axis (as shown in FIGS. 2 and 4). When the vehicle 10 is in motion, the fin(s) 70 are configured to streamline and direct the underbody airflow portion 25-1 along the vehicle underbody section 26, toward the rear end 18 of the vehicle body 14, and out to the ambient. Overall, the airflow regulation system 54 can provide enhanced aerodynamic characteristics for the vehicle 10 for improved energy efficiency and reduced noise at elevated road speeds by maintaining the moveable panel(s) 56 in closed or nearly closed state. Furthermore, the airflow regulation system 54 can generate on-demand airflow for cooling and ventilation of critical vehicle subsystems.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An airflow regulation system for a vehicle having a vehicle body including a first vehicle body end configured to face incident ambient airflow, a second vehicle body end opposite of the first vehicle body end, and a vehicle underbody section configured to span a distance between the first and second vehicle body end, and a vehicle subsystem arranged proximate the vehicle underbody section, the airflow regulation system comprising:
   a panel moveably mounted to the underbody section and configured to regulate access of an underbody portion of the incident airflow to the vehicle subsystem;
   a mechanism configured to shift the panel to selectively expose at least a part of the vehicle subsystem to the underbody portion of the incident airflow and shield the vehicle subsystem to thereby enhance aerodynamics of the vehicle body;
   at least one sensor configured to detect a vehicle operating parameter; and
   a controller in electronic communication with the at least one sensor and configured to regulate the mechanism to thereby selectively shift the panel in response to the detected vehicle operating parameter.

2. The airflow regulation system of claim 1, wherein the access of the underbody portion of the incident airflow to the vehicle subsystem is provided via a variable size access opening between the ambient and the vehicle underbody section, wherein the variable size access opening is defined by boundaries of the panel and the underbody portion, and wherein the panel is configured to be selectively shifted via the mechanism to vary the size of the opening.

3. The airflow regulation system of claim 1, wherein the mechanism includes at least one of a linear actuator, a rotary actuator, and an electric motor.

4. The airflow regulation system of claim 1, further comprising a track arranged on the vehicle body, wherein the panel is mounted to the vehicle body via the track and at least one roller.

5. The airflow regulation system of claim 1, wherein the panel is configured to tilt relative to the vehicle body.

6. The airflow regulation system of claim 1, wherein the at least one sensor includes a first sensor configured to detect a road speed of the vehicle and communicate the detected road speed to the controller, and wherein the controller is configured to selectively shift, via the mechanism, the panel relative to the vehicle body in response to the detected road speed of the vehicle.

7. The airflow regulation system of claim 6, wherein the at least one sensor additionally includes a second sensor configured to detect a temperature of the vehicle subsystem and communicate the detected temperature to the controller, and wherein the controller is configured to selectively shift, via the mechanism, the panel relative to the vehicle body in response to the detected temperature.

8. The airflow regulation system of claim 6, wherein the vehicle additionally includes a road wheel, and wherein the first sensor is configured to detect a rotating speed of the road wheel.

9. The airflow regulation system of claim 1, wherein the vehicle subsystem is one of an internal combustion engine, an exhaust system, a transmission assembly, a transfer case, and a differential.

10. A vehicle comprising:
- a vehicle body including a first vehicle body end configured to face incident ambient airflow, a second vehicle body end opposite of the first vehicle body end, and a vehicle underbody section configured to span a distance between the first and second vehicle body ends;
- a vehicle subsystem arranged proximate the vehicle underbody section;
- a panel moveably mounted to the underbody section and configured to regulate access of an underbody portion of the incident airflow to the vehicle subsystem; and
- a mechanism configured to shift the panel to selectively expose at least a part of the vehicle subsystem to the underbody portion of the incident airflow and shield the vehicle subsystem to thereby enhance aerodynamics of the vehicle body.

11. The vehicle of claim 10, wherein the access of the underbody portion of the incident airflow to the vehicle subsystem is provided via a variable size access opening between the ambient and the vehicle underbody section, wherein the variable size access opening is defined by boundaries of the panel and the underbody portion, and wherein the panel is configured to be selectively shifted via the mechanism to vary the size of the opening.

12. The vehicle of claim 10, wherein the mechanism includes at least one of a linear actuator, a rotary actuator, and an electric motor.

13. The vehicle of claim 10, wherein the airflow regulation system additionally includes a track arranged on the vehicle body, and wherein the panel is mounted to the vehicle body via the track and at least one roller.

14. The vehicle of claim 10, wherein the panel is configured to tilt relative to the vehicle body.

15. The vehicle of claim 10, further comprising at least one sensor configured to detect a vehicle operating parameter.

16. The vehicle of claim 15, further comprising a controller in electronic communication with the at least one sensor and configured to regulate the mechanism to thereby selectively shift the panel in response to the detected vehicle operating parameter.

17. The vehicle of claim 16, wherein the at least one sensor includes a first sensor configured to detect a road speed of the vehicle and communicate the detected road speed to the controller, and wherein the controller is configured to selectively shift, via the mechanism, the panel relative to the vehicle body in response to the detected road speed of the vehicle.

18. The vehicle of claim 17, wherein the at least one sensor includes a second sensor configured to detect a temperature of the vehicle subsystem and communicate the detected temperature to the controller, and wherein the controller is configured to selectively shift, via the mechanism, the panel relative to the vehicle body in response to the detected temperature.

19. The vehicle of claim 17, further comprising a road wheel, wherein the first sensor is configured to detect a rotating speed of the road wheel.

20. The vehicle of claim 10, wherein the vehicle subsystem is one of an internal combustion engine, an exhaust system, a transmission assembly, a transfer case, and a differential.

* * * * *